United States Patent
Geier et al.

(10) Patent No.: US 10,047,500 B2
(45) Date of Patent: Aug. 14, 2018

(54) REMOTE CONTROLLED COMPACTION MACHINE

(71) Applicant: Wacker Neuson Production Americas LLC, Menomonee Falls, WI (US)

(72) Inventors: Daniel Geier, Colgate, WI (US); David Schulenberg, Kewaskum, WI (US)

(73) Assignee: Wacker Neuson Production Americas LLC, Menomonee Falls, WI (US)

( * ) Notice: Subject to any disclaimer, the term of this patent is extended or adjusted under 35 U.S.C. 154(b) by 308 days.

(21) Appl. No.: 14/932,279

(22) Filed: Nov. 4, 2015

(65) Prior Publication Data

US 2016/0130785 A1 May 12, 2016

Related U.S. Application Data (60) Provisional application No. 62/076,809, filed on Nov. 7, 2014.

(51) Int. Cl.
*E02F 9/20* (2006.01)
*G05B 15/02* (2006.01)
(Continued)

(52) U.S. Cl.
CPC ............ *E02F 9/205* (2013.01); *E01C 19/004* (2013.01); *E01C 19/23* (2013.01); *E01C 19/262* (2013.01);
(Continued)

(58) Field of Classification Search
CPC ...... E01C 19/004; E01C 19/23; E01C 19/262; E02D 3/02; E02D 3/026; E02F 1/00; E02F 9/2004; E02F 9/205; G05B 15/02
(Continued)

(56) References Cited

U.S. PATENT DOCUMENTS

| 3,906,369 A | 9/1975 | Pitman et al. |
| 5,450,068 A | 9/1995 | Steffen |

(Continued)

FOREIGN PATENT DOCUMENTS

| DE | 41 39 041 A1 | 6/1992 |
| DE | 42 21 793 C1 | 2/1994 |

(Continued)

OTHER PUBLICATIONS

Operator's Manual for Trench Roller RT 56SC-2 and RT 82SC-2.

*Primary Examiner* — Chun Cao
(74) *Attorney, Agent, or Firm* — Boyle Fredrickson, S.C.

(57) ABSTRACT

A compaction machine such as a vibration trench roller has a supplemental receiver such as an eye located generally centrally of the machine and within a common reception zone of another receiver on the machine. The eye can receive a signal that is blocked from impinging upon the machine's other receiver(s), preventing the machine from shutting down when it passes beneath an obstruction and negating the need for the operator to reposition himself or herself to reestablish communications with the machine. The supplemental receiver may be positioned so as to maximize the operating range of the controller while reducing or avoiding false signals that otherwise could occur due to signal reflection. This positioning may include providing shielding around the supplemental receiver that creates a geometric umbrella of reception capability that forms a protection zone beneath it. Signals transmitted from within the protection zone cannot impinge on the supplemental receiver.

21 Claims, 8 Drawing Sheets

(51) Int. Cl.
 *E01C 19/00* (2006.01)
 *E01C 19/23* (2006.01)
 *E02D 3/02* (2006.01)
 *E02F 1/00* (2006.01)
 *E02D 3/026* (2006.01)
 *E01C 19/26* (2006.01)

(52) U.S. Cl.
 CPC .............. *E02D 3/02* (2013.01); *E02D 3/026* (2013.01); *E02F 1/00* (2013.01); *E02F 9/2004* (2013.01); *G05B 15/02* (2013.01)

(58) Field of Classification Search
 USPC ........................................................ 700/275
 See application file for complete search history.

(56) References Cited

U.S. PATENT DOCUMENTS

| | | | |
|---|---|---|---|
| 5,594,427 A | 1/1997 | Kim et al. | |
| 5,816,741 A | 10/1998 | Troppman, III | |
| 6,285,925 B1 | 9/2001 | Steffen | |
| 6,846,128 B2 | 1/2005 | Sick | |
| 6,997,648 B2 | 2/2006 | Steffen | |
| 7,354,221 B2 | 4/2008 | Congdon | |
| 7,657,492 B2 | 2/2010 | Rieger et al. | |
| 7,753,621 B2 | 7/2010 | Steffen | |
| 8,585,317 B1 | 11/2013 | Sina | |
| 8,672,582 B2 | 3/2014 | Loew et al. | |
| 8,970,363 B2 * | 3/2015 | Kraimer | B60R 21/0132 172/2 |
| 9,312,599 B2 * | 4/2016 | Tinaphong | H04N 7/06 |
| 9,340,214 B2 * | 5/2016 | Funke | G05D 1/0022 |
| 2003/0058087 A1 * | 3/2003 | Wenzel | E02D 5/26 340/438 |
| 2006/0113122 A1 | 6/2006 | Persson | |
| 2008/0208395 A1 | 8/2008 | Self et al. | |

FOREIGN PATENT DOCUMENTS

| | | |
|---|---|---|
| DE | 196 00 791 A1 | 7/1997 |
| EP | 0 514 244 A1 | 11/1992 |
| EP | 1 158 100 A2 | 11/2001 |

* cited by examiner

REMOTE CONTROLLED COMPACTION MACHINE

CROSS REFERENCE TO A RELATED APPLICATION

This application claims priority under 35 USC § 1.119(e) to earlier U.S. Provisional Patent Application Ser. No. 62/076,809, filed Nov. 7, 2014 and entitled REMOTE CONTROLLED COMPACTION MACHINE, the contents of which are incorporated by reference in their entirety.

BACKGROUND OF THE INVENTION

1. Field of the Invention

The present invention relates to remote controlled compaction machines such as trench rollers and, more particularly, relates to a compaction machine with improved remote control capabilities and to a method of operating such a machine.

2. Discussion of the Related Art

Compaction machines are used in a variety of ground compaction and ground leveling applications. Most compaction machines have supports in the form of plates or rollers that rest on the surface to be compacted, and most of these supports are excited to vibrate so as to compact and level a worked surface. These machines are commonly referred to as "vibratory compactors."

A common vibratory compactor, and one to which the invention is well-suited, is a vibratory trench roller. The typical vibratory trench roller includes a chassis supported on the surface to be compacted by front and rear rotating drum assemblies. Each drum assembly supports a respective subframe of the chassis. In the case of an articulated trench roller, the subframes are coupled to one another by a pivot connection. Each of the drum assemblies may include a stationary axle housing and a drum that is mounted on the axle housing and that is driven to rotate by a dedicated hydraulic motor. Hydraulic motors are typically supplied with pressurized hydraulic fluid from a pump which may be powered by an engine mounted on one of the subframes.

Each drum may be excited to vibrate by a dedicated exciter assembly that is located within the associated subframe and is powered by a motor connected to a pump. Each exciter assembly typically comprises one or more eccentric masses mounted on a rotatable shaft positioned within the subframe. Rotation of the eccentric shaft imparts vibrations to the subframe and to the remainder of the drum assembly. The entire machine may be configured to be as narrow as possible so as to permit the machine to fit within a trench whose floor is to be compacted. Machine widths of less than 3 feet (1 meter) are common. Vibratory trench rollers of this basic type are disclosed, e.g., in U.S. Pat. No. 4,732,507 to Artzberger; U.S. Pat. No. 4,793,735 to Paukert; U.S. Pat. No. 5,082,396 to Polacek; U.S. Pat. No. 7,059,802 to Geier et al.; and U.S. Pat. No. 8,585,317 to Sina, the entireties of which are hereby expressly incorporated by reference thereto.

Vibratory trench rollers often are controlled remotely using a transmitter on a remote controller that transmits infrared (IR) or other signals to the trench roller on a line-of-sight basis. The control signal is generated by manipulation of a joystick and/or other controls on the remote controller and controls operation of the machine. The IR signal is received by a receiver in the form of a photo-detector or "eye" on the machine, causing the machine to stop or start travel in the desired direction (forward or reverse) and/or to control the machine's exciter assemblies. Two a signals may be transmitted simultaneously, namely, a relatively high-intensity control signal having a range of on the order of 50-65 feet (15-20 meters) and a relatively low intensity safety signal having a range of about 6.6 feet (2 meters). The safety signal is generated whenever the remote controller is active and causes the machine to cease moving upon receipt of the safety signal. The machine thus stops moving if the operator is located in a "safety zone" that is typically within about 6.6 feet (2 meters) of to the machine.

Figure 1:
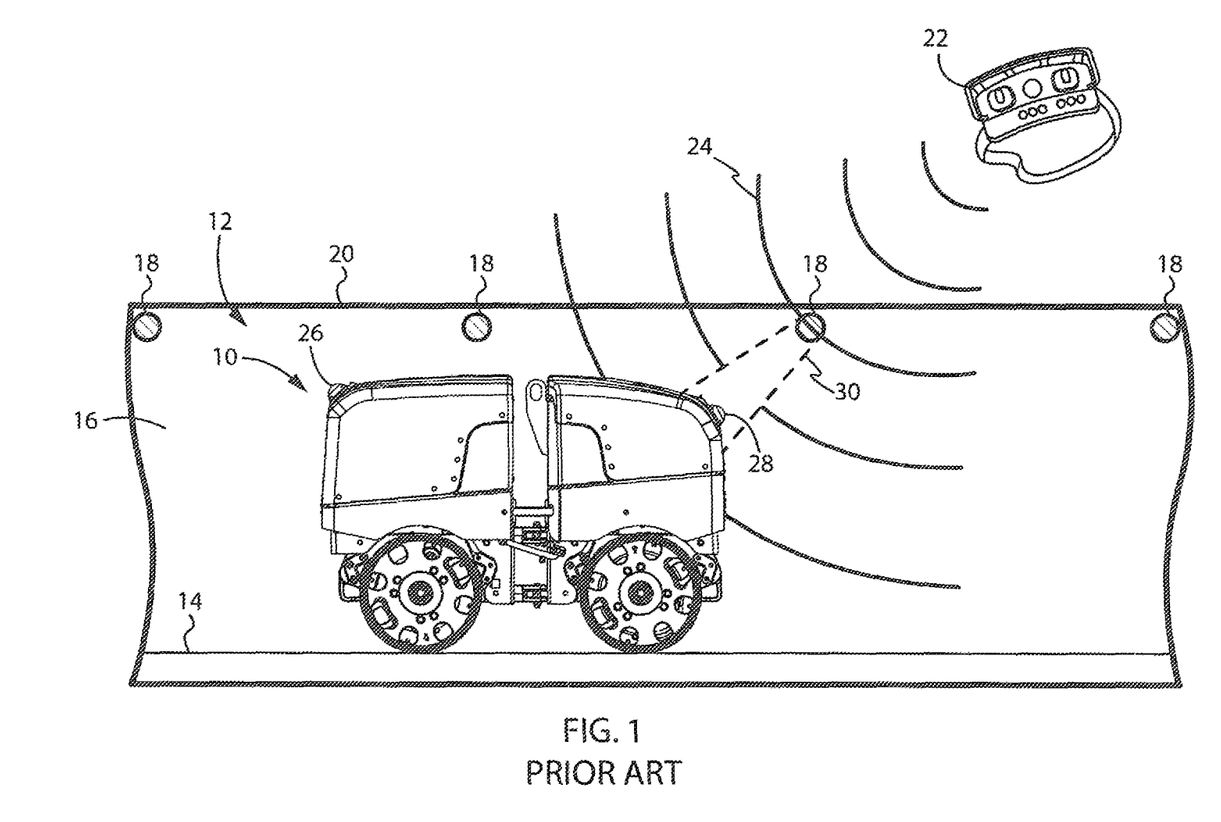
FIG. 1 is a somewhat schematic sectional side elevation view of a trench in which a prior art vibratory trench roller is positioned, and is appropriately labeled "PRIOR ART"

Trench rollers often are used in trenches having reinforced side walls. For example, referring to FIG. 1, a vibratory trench roller or "machine" 10 may be used to compact the floor 14 of a trench 12. The reinforcement or "trench shoring" often takes the form of vertical reinforcing sheets or walls 16 located along each side wall of the trench 12 and a number of spaced cross supports 18 extending laterally between the side walls near the top edge 20 of the trench 12. The machine 10 typically is controlled by an operator stationed above the trench 12 via a hand-held remote controller 22. The remote controller 22 transmits an IR signal 24 that propagates in an expanding arc until it impinges on the machine 10, where it is detected by one of two eyes 26 and 28 located on opposite ends of the machine 10. Each eye 26 or 28 faces to the rear or front of the machine 10 and often cannot receive signals from an operator standing beyond the opposite end of the machine. Thus, each eye 26 or 28 can be considered to be associated with its own dedicated "reception zone." This means that, under many operating conditions, only one eye 26 or 28 can receive signals 24 from the remote controller 22 at any given time.

Being located between the remote controller 22 and the machine 10, the cross supports 18 can block a portion of the signals 24, creating a "dead zone" formed by a "shadow" located downstream of the cross support 18 in the direction of IR signal propagation. The dead zone is bordered by the line 30 in FIG. 1. The machine 10 shuts down when the operative eye (rear eye 28 in the illustrated example) is positioned in the dead zone and experiences loss of signal, requiring the operator to reposition the remote controller 22 to a location in which signal receipt by the eye 28 can be reestablished. The need to reposition can be irksome to the operator, particularly if he or she is positioned on another machine, such as an excavator, and either has to move the machine or climb down off from it to reposition the remote controller 22.

The need therefore has arisen to provide a remote-control-operated vibratory trench roller or other compaction machine that does not experience loss of signal when the machine passes beneath or behind an obstruction such as a cross support of a shored trench.

The need additionally has arisen to provide a method of operating such a compaction machine.

SUMMARY OF THE INVENTION

In accordance with an aspect of the invention, a compaction machine such as a vibratory trench roller is provided with a supplemental receiver such as a photo detector located generally centrally of the machine. It may be located within a common reception zone of another receiver on the machine. The supplemental receiver can receive a signal from a remote controller that is blocked from impinging upon the machine's other receiver(s), preventing the machine from shutting down when it passes beneath or behind an obstruction such as cross-support of a trench shoring system. The supplemental receiver thus negates the need for the operator to reposition himself or herself to reestablish communications with the machine.

In a possible implementation, the machine includes a mobile chassis, a compaction device on which the mobile chassis is mounted and which compacts the surface on which the machine is supported, and first and second receivers configured to simultaneously receive a line of sight-based signal from the same remote controller, whereby one of the receivers will continue to receive the signal if a signal path to the other receiver is blocked by an obstruction.

The first receiver of this configuration may be supported on the chassis in the vicinity of a first longitudinal end of the machine, and the second receiver may be supported on the chassis in the vicinity of a longitudinal center of the machine. A third receiver may be supported on the chassis in the vicinity of a second longitudinal end of the machine opposite the first longitudinal end. The second receiver is located in a first common reception zone with the first receiver and in a second common reception zone with the third receiver.

The supplemental receiver may be positioned so as to maximize the operating range of the remote controller while reducing or avoiding the receipt of false activation signals that otherwise could occur due to signal reflection off from, for example, an operator located in the vicinity of the machine. This positioning may include providing shielding around the supplemental receiver that creates a geometric umbrella of reception capability that forms a protection zone beneath it. Signals transmitted from within the protection zone cannot impinge on the receiver.

For example, the shielding may comprise a recess in a portion of the hood in which the second receiver is mounted and/or a shield that is located laterally between the second receiver and an edge of the recess and that extends above a base of the recess Also provided is a method of operating a compaction machine that includes simultaneously transmitting a control signal from a remote controller to first and second spaced receivers in a common reception zone on a compaction machine such that, if the transmission of the control signal to one of the receivers is blocked, by an obstruction, the control signal is still received by the other receiver.

The first and second receivers may be located in the vicinity of a front end of the machine and a central portion of the machine, respectively, and the compaction machine may further comprise a third receiver located in the vicinity of a second end of the machine. In this case, the transmitting step causes the signal to impinge either the first and second receivers in a first reception zone or the second and third receivers in a second reception zone in the absence of the presence of an obstruction.

An additional step may comprise blocking receipt of control signals to the second receiver that are located in a protection zone located beneath a geometric umbrella of reception capability extending around the second receiver.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 2:
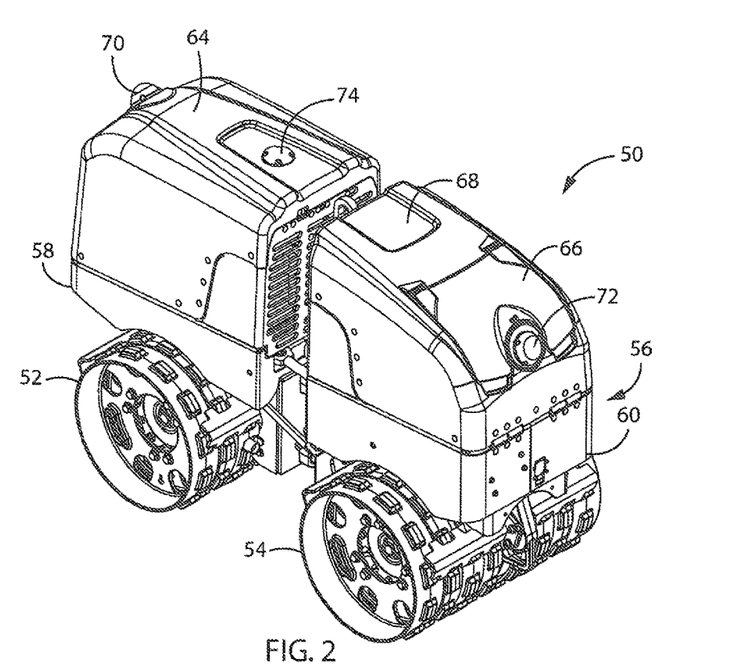
FIG. 2 is an isometric view of a vibratory trench roller constructed in accordance with an embodiment of the invention.
Figure 3:
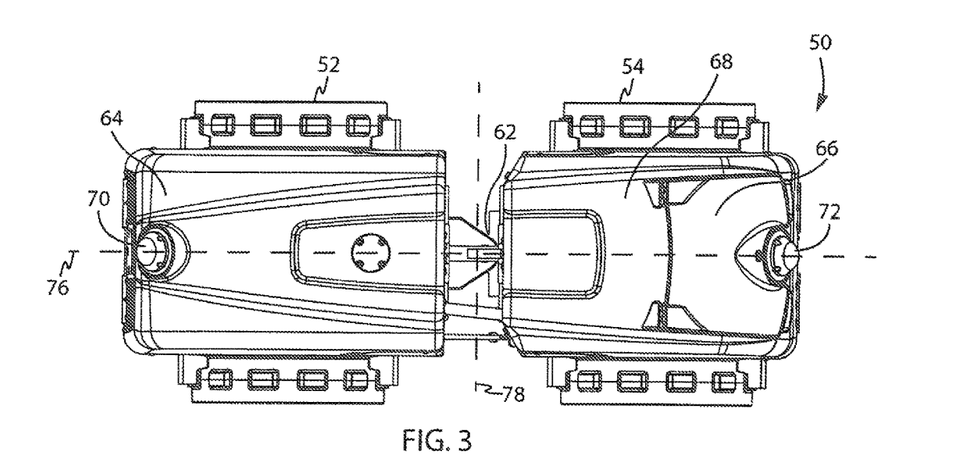
FIG. 3 is a top plan view of the trench roller of FIG. 2.

Referring now to the drawings, and initially to FIGS. 2 and 3, an exemplary compaction machine 50 is illustrated that is constructed in accordance with an embodiment of the present invention. The machine 50 of this embodiment is a vibratory trench roller 50. The vibratory trench roller 50 comprises a self-propelled machine supported on the ground via a front rotating drum assembly 52 and a rear rotating drum assembly 54. It is typically used to compact the bottom of trenches prior to laying pipelines or the like and/or to compact recently-filled trenches. The machine 50 comprises an articulated chassis 56 having front and rear subframes 58 and 60, respectively. The front and rear subframes 58 and 60 are connected to one another via a pivot connection 62 and are supported on the ground via the front and rear drum assemblies 52 and 54, respectively. The chassis 56 may have a narrow width, such as about 20 inches (50 cm) wide, to permit the machine 10 to be used to compact the bottom of relatively narrow trenches for laying pipeline and the like. The front subframe 58 may support an engine (not shown) accessible via a ventilated hood 64. The rear subframe 60 may support a control system for the machine 50 as well as an enclosed storage compartment accessible via a pivotable cover 66 on a rear hood 68. As is generally understood in the art, each of the front and rear drum assemblies 52 and 54 may be excited to vibrate by a dedicated exciter assembly (not shown) that is powered by a drive system. Each exciter assembly typically comprises one or more eccentric masses (not shown) mounted on a rotatable shaft(s) (not shown) positioned within an axle housing. Rotation of each eccentric mass imparts vibrations to the associated axle housing and, in turn, to the remainder of the drum assembly. In this way, the front and rear rotating drum assemblies 52 and 54 are operable to compact the ground.

Still referring to FIGS. 2 and 3, first and second receivers 70 and 72 or "eyes" are located at the front and rear ends of the machine 50, respectively, typically near the edges of the front and rear hoods 64 and 68. Each eye 70 and 72 also is mounted on or near a longitudinal centerline 76 of the machine 50. In addition, and pursuant to an embodiment of the invention, a supplemental third eye 74 is provided at a location designed to be within a common reception zone with either of the eyes 70 or 72. A "reception zone", in this context, should be understood to mean a volume occupied by a given IR signal being transmitted from a given location as described below. The eye 74 is located in a first common reception zone with eye 70 and a second common reception zone with eye 72.

Each of the eyes 70, 72, and 74 of the illustrated embodiment is an IR photodetector. Each of the eyes 70, 72, and 74 includes a receiver and related circuitry forming a module that is mounted in an opening in the respective hood 64 or 68 and that is covered by a protective transparent cover bolted to the hood 64 or 68. One such cover is shown at 75 in in the exploded view of FIG. 7. However, as discussed below, each eye 70, 72, and 74 could be configured to detect signals in other spectrums in addition to or instead of signals transmitted in the IR spectrum.

Electronics of the machine 50 receive signals from the eyes 70, 72, and 74 to start and stop the machine 50, to control propulsion and steering of the machine 50 in a desired (forward or reverse) direction, and to control the machine's exciter assemblies.

Preferably, the third or supplemental eye 74 is located on top of the machine 50 and generally laterally centrally of the machine 50, and most preferably at or adjacent the longitudinal centerline 76 of the machine 50, so as to be generally equally accessible from both sides of the machine 50. The eye 74 also is positioned generally longitudinally centrally of the machine 50 so as to be within about ⅓ of the machine's length from its lateral centerline 78 and possibly generally equidistant from each of the eyes 70 and 72. In a machine that is 8 feet (2.43 m) long, the third eye 74 preferably is located within 1.5 feet (0.3 m), and more preferably within 1 foot inches (0.30 m) of the lateral centerline of the machine 50. As a result, the effective reception zone is of generally equal size for the combination of the first and third eyes 70 and 74 and for the combination of the second and third eyes 72 and 74. In the present case, the third eye 74 is located on the rear portion of the front subframe 58 on top of the hood 64. Preferred positioning of the third eye 74 on the hood 64 is discussed below.

Figure 4:
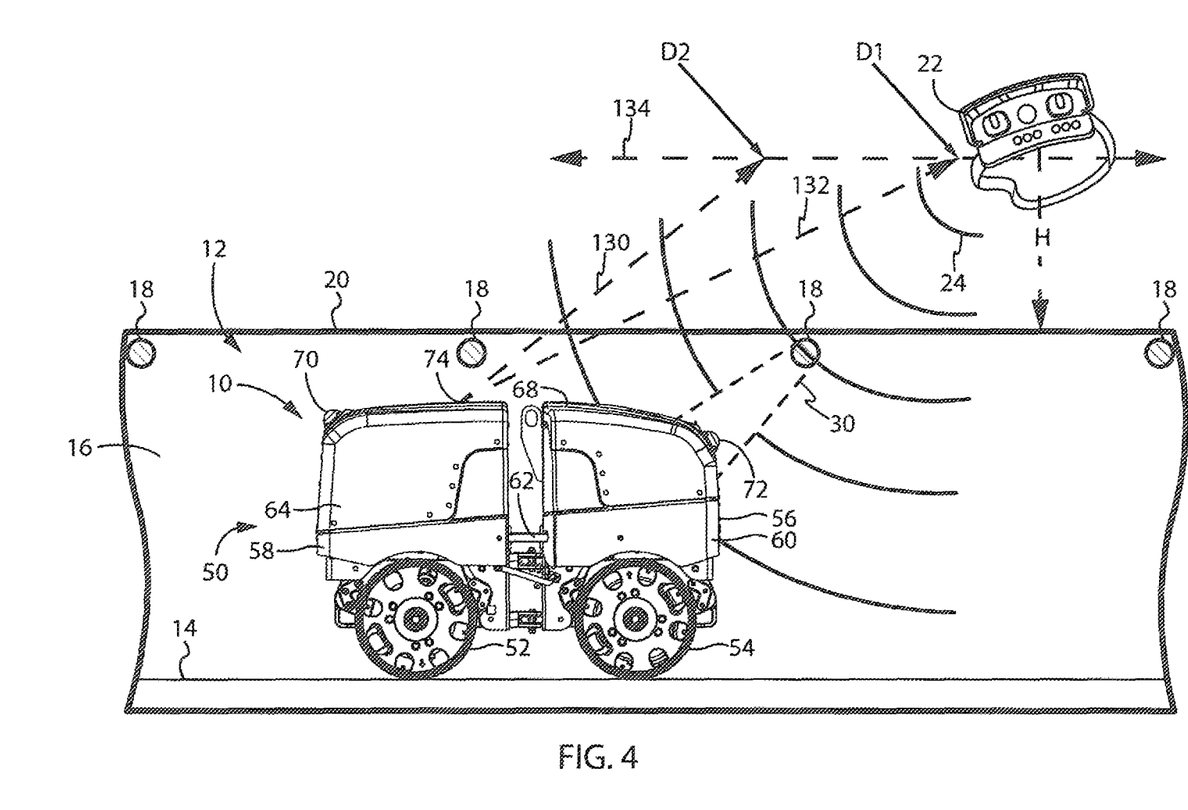
FIG. 4 is a somewhat schematic sectional side elevation view of a trench with the trench roller of FIGS. 2 and 3 positioned therein.

The operational benefits of the third eye 74 can be appreciated with reference to FIG. 4. The roller 50 is shown as being used to compact the floor 14 of the trench 12 described above in conjunction with FIG. 1. The trench 12, which may be 6-12 feet (1.8-3.6 meters) deep or even deeper, is shored with vertical reinforcing walls located along each side wall of the trench 12 and a number of spaced cross supports 18 extending laterally between the side walls 16, typically near the top 20 of the trench 12. The reinforcing walls 16 and cross supports 18 may be formed by a "trench box" as is well known in the industry.

The machine 50 is controlled by an operator stationed above the trench 12 via a hand-held remote controller 22 that transmits an IR signal 24. The remote controller 22 can be actuated to control some or all operating parameter of the machine. For example, it can be used to start and stop the engine. It also can be used to control the FORWARD/REVERSE direction of machine travel and to steer the machine 50, possibly using joysticks on the remote controller 22. Remote controller 22 also can be used to control the machine's vibrations as generated by the exciters, including at least an "ON/OFF" control and possibly including controlling vibration intensity as well such as via a "HIGH/LOW" control. The IR signal 24 can be set to one of several different control channels in order to allow multiple machines to operate in the same area without interference from one another. This function can be controlled, for example, by a channel selection switch on the remote controller 22. The remote controller 22 performs these functions by transmitting an IR signal 24 that propagates from the remote controller 22 in an expanding arc until it impinges on the machine 50. The signal 24 is received by one or more of the eyes 70, 72, and 74 on the machine 50, transmitted to the machine's circuitry, and decoded to execute the commands transmitted by the remote controller 22.

In the position shown, the front eye 70 is outside of the second "reception zone" of the remote controller 22 because it, is not within the arc of the IR signal 24. In addition, rear eye 72 is in a "dead zone" consisting of the "shadow" located downstream of one of the cross supports 18 in the direction of IR signal propagation. The dead zone is bordered by the line 30 in FIG. 4. However, even through transmission to the eye 72 is blocked by the obstruction 18, the machine 50 nevertheless continues to be controlled because the signal 24 is still received by the third eye 74, which is positioned in a common reception zone with the eye 72. But for the presence of the third eye 74, the machine 50 would have shut down due to loss of signal, and the operator would have to reposition himself or herself so that the eye 72 is outside of the dead zone in order to resume machine operation.

It should be mentioned that the third eye 74 also is in a common reception zone with the first eye 70 so that an operator positioned in front of and above the machine 50 could continue to operate the machine 50 even if signal transmission to the first eye 70 was blocked by a cross support 18 or other obstruction.

Figure 5:
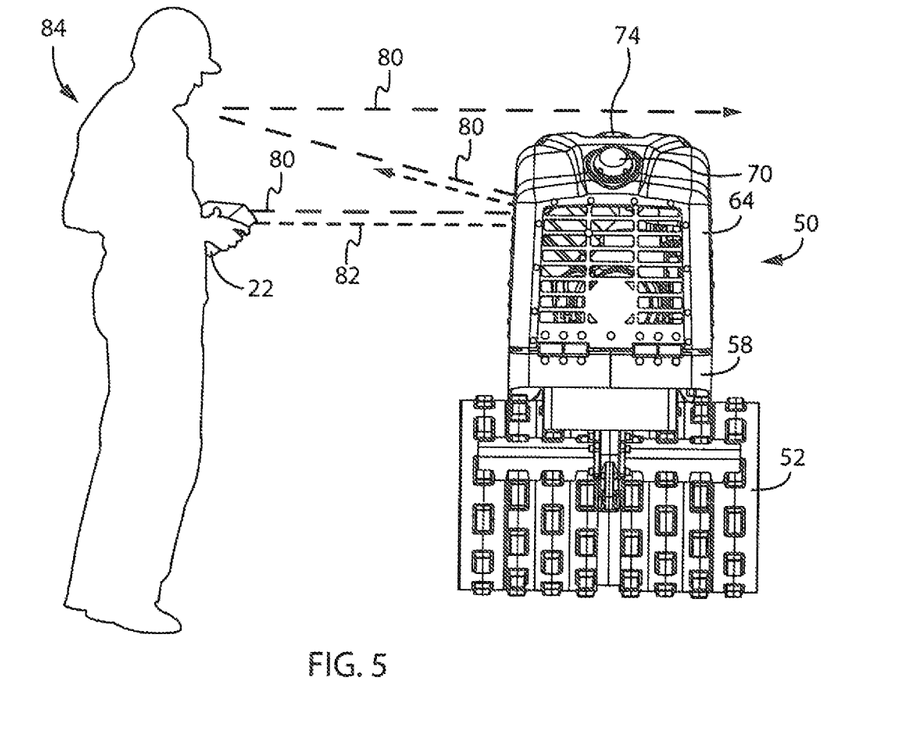
FIG. 5 is a front elevation view of the trench roller of FIGS. 2-4, shown in with control signals reflecting to and from an operator.

Referring now to FIG. 5, the remote controller 22 may be configured to transmit two separate IR signals simultaneously. The first signal 80 is a relatively high-intensity control signal 80 having a range of on the order of 50-65 feet (15-20 meters). This signal is often called a "far field" signal. The second signal 82 is a relatively low-intensity safety signal 82 having a range of about 6.6 feet (2 meters). This signal often is called a "near field" signal. The safety or near field signal 82 may be generated whenever the remote controller 22 is active and causes the machine 50 to cease moving and vibrating upon machine receipt of the safety signal 82 via one or more of the eyes 70, 72, and 74. The machine 50 thus stops moving and vibrating if an operator 84 is located in a "safety zone" of about a 2 meter radius from the machine 50.

As can be seen by the arrows representing the signals 80 and 82 in FIG. 5, both signals 80 and 82 can be reflected off the machine 50. The near filed signal 82 is too weak to reflect back to the operator 84 unless the operator is positioned very near the machine 50, well within the 2 meter safety zone. However, when the operator 84 is located in this safety zone, the much stronger far field signal 80 may reflect off the machine 50, to the head or shoulders of the operator 84, and back to the machine 50. If the supplemental or third eye 74 is not shielded from this reflected signal, the reflected signal may impinge on the eye 74, causing the machine 50 to move despite the fact that the operator is located within the safety zone.

Figure 6:
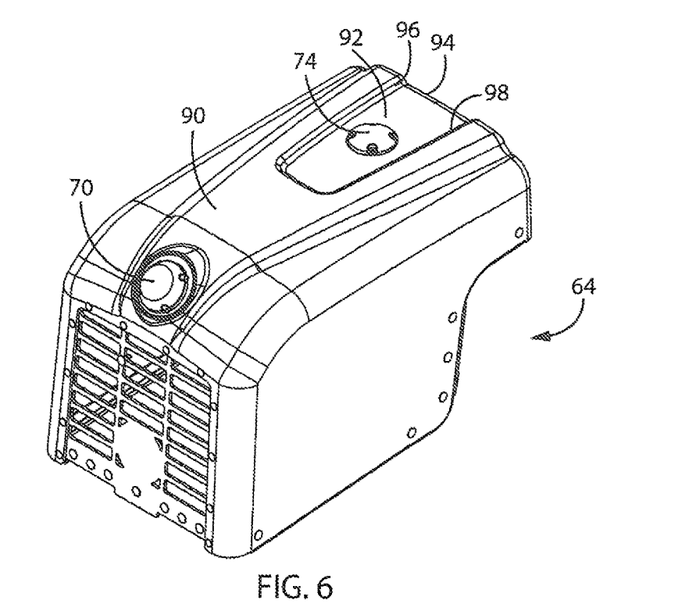
FIG. 6 is an isometric view of a hood of the trench roller of FIGS. 2-5.
Figure 7:
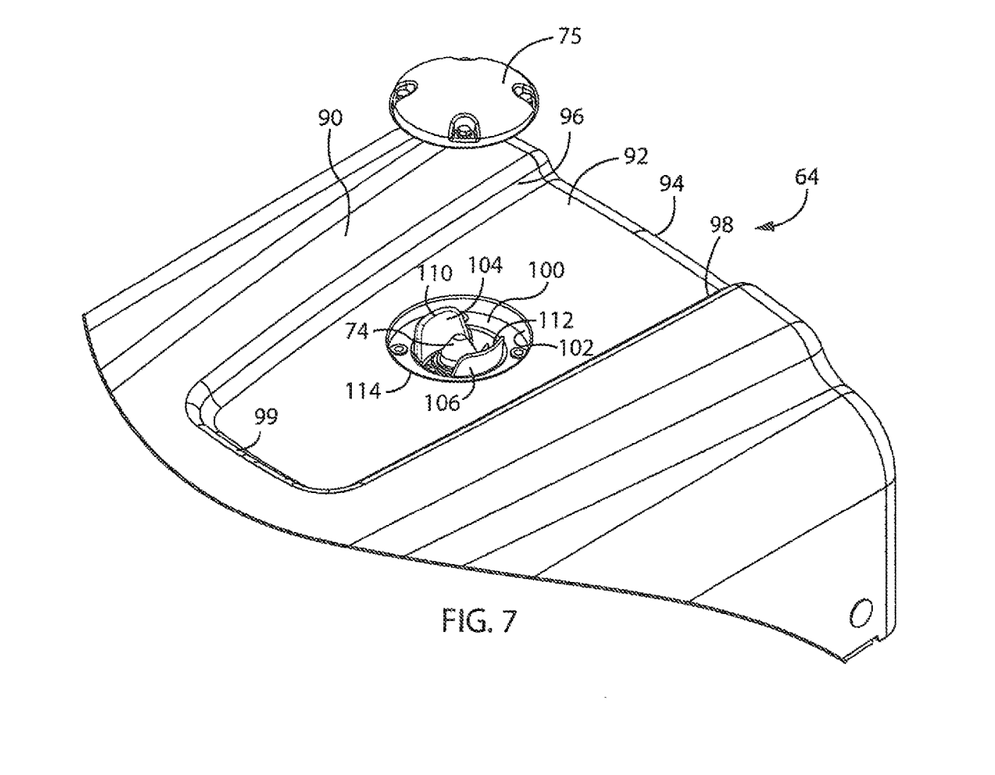
FIG. 7 is an enlarged fragmentary isometric view of a portion of the hood of FIG. 6.

Referring now to FIGS. 6 and 7, the desired shielding is achieved in the present embodiment by recessing the third eye 74 within an upper surface 90 of the hood 64 and by providing additional shielding adjacent the eye 74. The resultant geometry produces a protection zone that prevents signals that are transmitted from beneath a desired height within the 2 meter safety zone from impinging on the eye 74. This shielding is sufficient to reduce or avoid transmission of a reflected far field signal in the safety zone to the eye 72 without unacceptably reducing the effective operational range of the remote controller 22, especially from in front of and behind the machine 50.

Turning now to FIG. 6, the eye 74 of this embodiment is mounted in a recess 92 in the rear end portion of the upper surface 90 of the hood 64. The recess 92 extends longitudinally of the hood 64 from a rear edge 94 toward approximately the center of the hood 64 and is laterally centered on the hood 64. Recess 92 is bordered at its lateral edges by generally longitudinally extending right and left sidewalls 96 and 98 and at its front edge by a front wall 99. The depth, length, and width of the recess 92, as determined by the length, height, and spacing between the sidewalls 96 and 98 and the location of the front wall 99, depend largely on aesthetics, so long as the recess 92 is wide enough and deep enough to form an incident angle from the eye 74 to the upper edge of the front wall 99 and each sidewall 96 and 98 of the recess that is shallow enough to achieve the protective effects discussed below.

Figure 8:
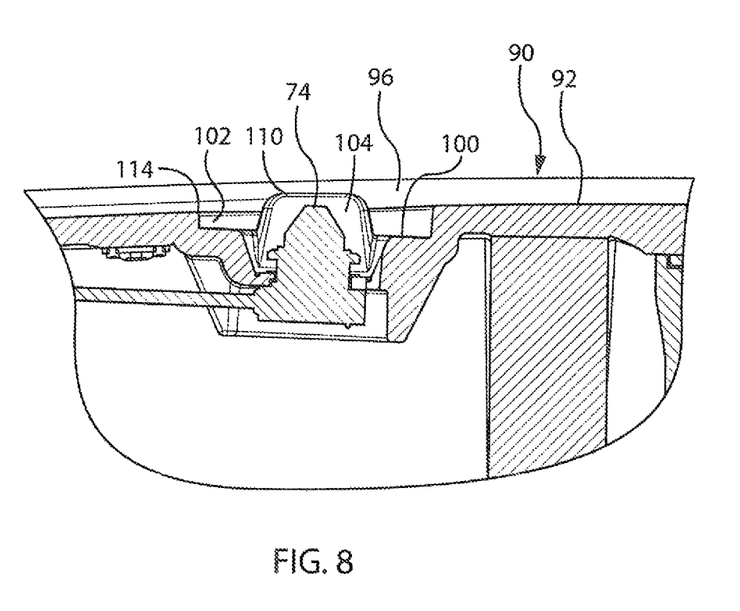
FIG. 8 is an enlarged fragmentary side elevation view of a portion of the hood of FIG. 6.

Referring to FIGS. 7 and 8, in which a protective IR transparent covering over the eye 74 has been removed, the eye 74 is mounted in a pocket 100 that is formed in the bottom of the recess 92 and that is bordered by a peripheral wall 102. The pocket 100 is stepped in this embodiment so as to receive the eye 74 in a deeper central portion thereof. The pocket 100 is circular but could be other shapes as well. First and second arcuate side shields 104 and 106 are positioned laterally between the eye 74 and the peripheral wall 102 of the pocket 100, and thus laterally between the eye 74 and the respective sidewalls 96 and 98 of the recess 92. Each shield 104 and 106 extends at least generally vertically 1) from a base located within the outer edge of the central, deeper portion of the pocket 100 2) to an upper edge 110, 112 thereof. The purpose of these shields 104 and 106 is to block IR radiation being transmitted toward the eye 74 below a relatively shallow angle that may be generated when the signal is reflected off from an operator standing near the machine 50 as opposed to being transmitted directly by the remote controller 22 from a safe distance above the machine 50. A protection zone of expanding height, below which the eye 74 cannot receive a control signal, thus extends completely around the machine 50.

The volume of the protection zone, as well as the radius, arc length, height, and inclination of each of the shields 104 and 106 and area and depth of the pocket 100, are largely application specific. They also are a matter of designer preference in recognition of the fact that any signal blockage comes at the cost of a reduction of operational range. That reduction comes in the form of being unable to transmit signals to the eye 74 from within the protection zone. The shields 104 and 106 thus need not, and preferable do not, completely encircle the eye 74. Instead, they leave gaps in front of and behind the eye to reduce the magnitude of the angle in front of and behind the machine 50, thus facilitating control of the machine 50 by an operator stationed in or near a trench in front of or behind the machine 50. Referring again to FIG. 4, a steeper angle, indicated by line 130, undesirably limits the minimum distance that the operator can be from the machine 50 while holding the remote controller 22 at a given reference height "H" (indicated by line 134, with the reference height being measured from the top 20 of the trench 12 simply for convenience) and still achieve line of sight for control of the machine 50 via the eye 74. A shallower angle, indicated by line 132, increases this minimum distance. Compare points D1 and D2 on line 134 in FIG. 4. Of course, the machine 50 also can be controlled if the IR signal impinges one of the other eyes 70 or 72.

Toward these ends, each shield 104 and 106 extends through an effective arc, i.e., an arc length in which the shield extends to a height providing shielding beyond that provided by other components of the machine, of less than 180°, and more typically through an arc length of about 60° to 100° °. As with other design considerations, the height and shape of each shield 104, 106, as well as its distance from the eye 74, is designed to produce a protection zone of desired configurations as described immediately below and are largely determined by overall machine geometry and designer preference.

Figure 9:
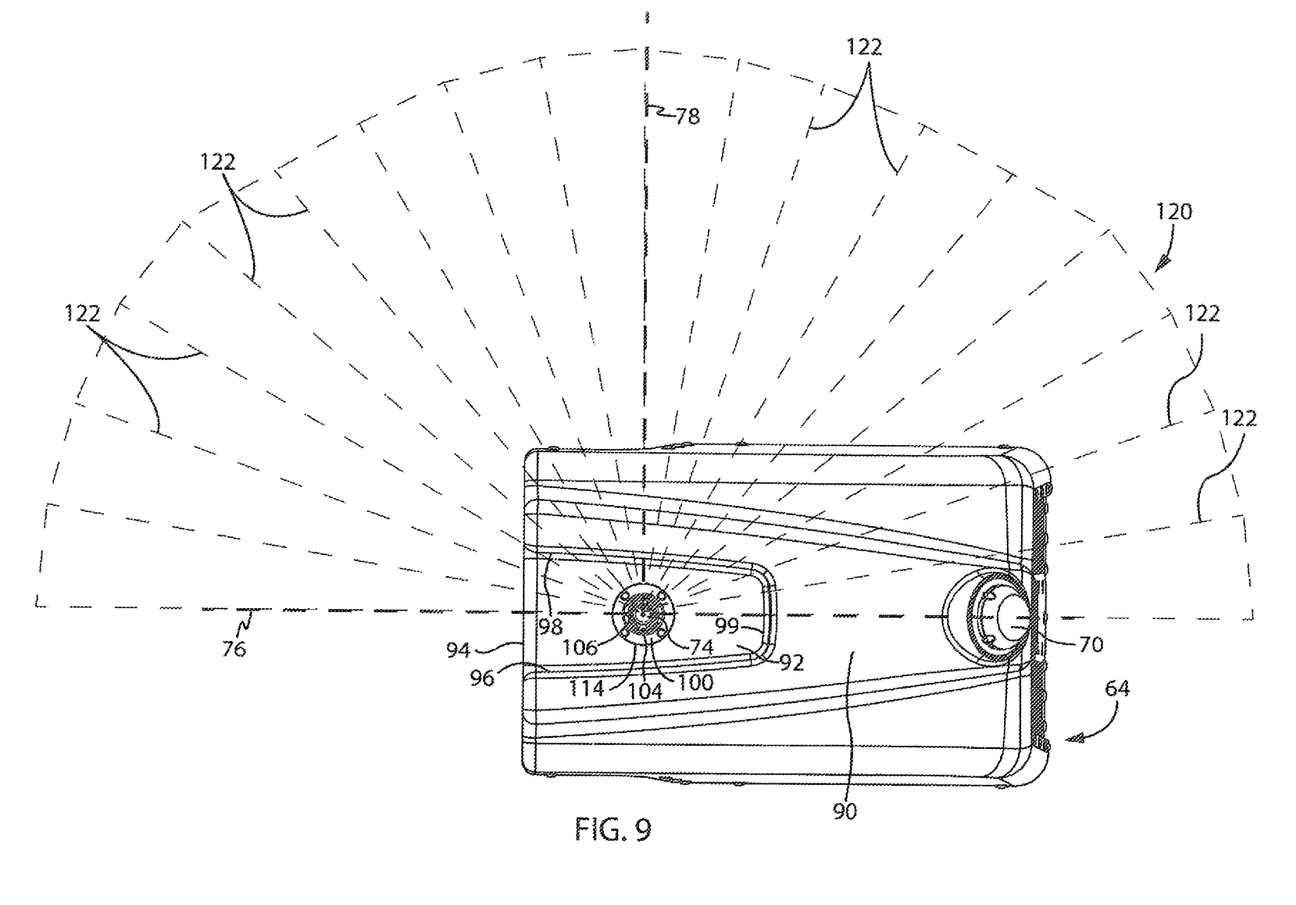
FIG. 9 is a top plan view of the hood of FIGS. 6-8, showing an umbrella beneath which a protection zone is formed.
Figure 10:
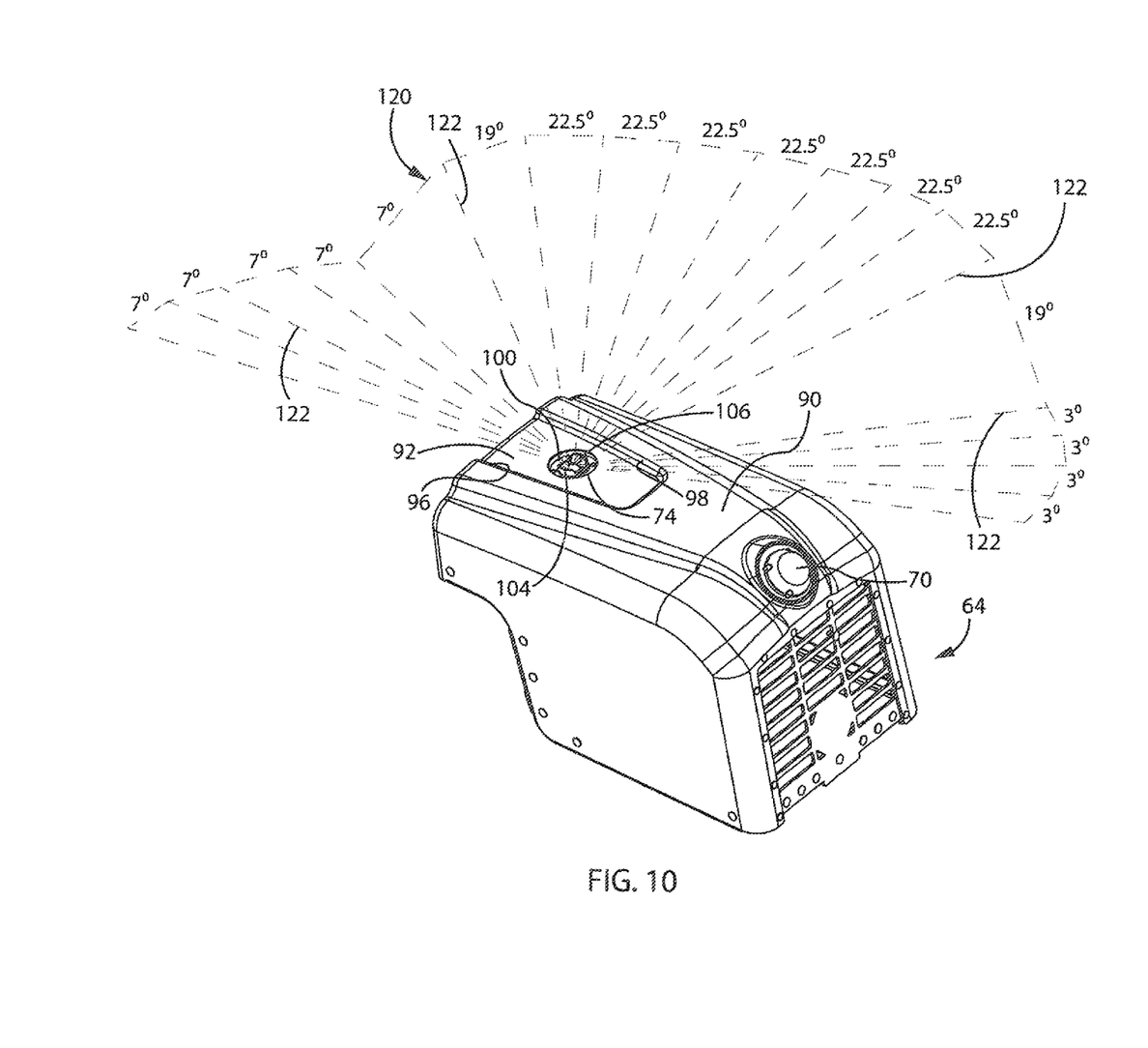
FIG. 10 is an isometric view corresponding to FIG. 9.

One possible configuration of the protection zone as determined by the dimensions, shape, and positioning of the recess 92, the pocket 100, and the shields 104 and 106 collectively forming the shielding, can be appreciated with reference to FIGS. 9 and 10, which show a geometric "umbrella" 120 formed by an infinite number of lines 122 extending around the eye 74. Nineteen such lines 122 are shown in FIGS. 9 and 10, spaced at 10 degree increments to form eighteen segments the angle of each of which relative to the horizontal is designated in FIG. 10. Signals transmitted in the protection zone beneath the umbrella 120, whether transmitted directly or by reflection, cannot impinge on the eye 74. The umbrella 120 of this embodiment is symmetrical about the longitudinal centerline 76 of the machine 50, so only half of the umbrella 120 is illustrated, it being understood that that the other half is a mirror image of the illustrated half. Each line 122 of the umbrella 120 extends from the eye 74 to an obstruction that blocks IR light from below that line from impinging on the eye 74. The obstruction may, for example, comprise the top edge 110 or 112 of one of the shields 104 or 106 or a top edge 114 of the pocket wall 102. The angle of each line 122 relative to the horizontal depends on the height of the corresponding obstruction and the horizontal distance from that obstruction to the eye 74. Thus, if the obstruction is formed by the top edge 110 of the central portion of the shield 104, the angle is determined by the horizontal and vertical distances between the eye 74 and the upper edge 110 of the central portion of the shield 104.

Under typical operating conditions, the remote controller 22 is held at arm's length and about chest height.

When the operator 84 is in this position and is located within the trench 12, the mere fact that that the eye 74 is recessed within the pocket 100 prevents signals from reaching the eye 74 because the remote controller 22 is beneath the height of the machine 50. As discussed above in conjunction with FIG. 5, when the operator 84 approaches the machine 50, the far field IR signals can reflect off the side of the machine 50 at an upward angle, then reflect off the operator's upper body or head, and then impinge on top of the machine 50. However, the shields 104 and 106 prevent the signal from reaching the eye 74 in this situation and, thus, present undesired machine propulsion.

Referring again to FIGS. 9 and 10, the angles of the lines 122 were developed specifically for the illustrated vibratory trench roller 50 and are based on the height and width of the roller 50 and other aspects of roller geometry. The actual angles of the lines 122 relative to the horizontal illustrated roller 50 are designated in FIG. 10. The lines that extend at 22.5°, for instance, cover an area of 7 radial segments of 10° each, or 70°. The next 10° segment on each end of this segment of the umbrella 120 start to taper down slightly to 19°, and thereafter essentially drops off completely. The angle of the lines 122 extending directly over the front and rear ends of the machine 50 ideally should be zero or even of a negative slope. However, because the upper surface 90 of the hood 64 of this particular machine 50 is sloped, the inventors could only achieve a 7° angle toward the rear and a 3° angle toward the front. The deviations of these values from the ideal are insignificant to the design. The most important part of the design from an operator safety standpoint is the 90° of coverage in the middle portion of the umbrella 120 or, stated another way, in an arc extending 45° from either side of a line 78 that laterally bisects the umbrella 120. The resultant configuration obtains good protection to the sides of the machine 50 by providing relatively steep umbrella angles but, as discussed above in connection with FIG. 4, maximizes the operational range in front of and from the rear of the machine where the operator is most likely to be positioned during operation.

It must be emphasized that the shape of the geometric umbrella 120 and thus of the safety zone beneath it is highly dependent on the machine design. If the machine 50 were to be longer in length than the illustrated 8.0 feet (2.43 m), it may be desirable to enlarge the size of the protection zone to accommodate the longer machine. As another example, if the machine were lower to the ground than illustrated, this angle would need to be steeper to provide the same level of operator protection.

The ideal shape of the geometric umbrella 120 also is dependent on the the reflectivity of the particular signals being transmitted from the controller 22. More reflective signals would counsel for a more aggressive design providing a larger protection zone.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

For example, while the invention has been described in conjunction with a two-axle articulated trench roller, it is to be understood that the invention may be applicable to other remote-controlled rollers having more or fewer than two axles such as to skid steer rollers. It is also applicable to remote controlled compaction machines other than rollers, such as vibratory plate compactors. In addition, while the machine 50 is described as having three receivers, it is to be understood that the invention is applicable to machines having more or less than three receivers, so long as at least one of the receivers offers at least some the redundancy features of the eye 74 described herein so as to assure continued machine operation if the transmission of the control signal to another receiver is blocked by an obstruction. In addition, the concepts described herein are applicable to line of sight remote control systems other than IR based control systems. For instance, it is conceivable that the control signals could be in the UV, visible, microwave, or radio spectrum rather than the IR spectrum.

What is claimed is:
1. A compaction machine:
a mobile chassis a compaction device on which the mobile chassis is mounted and which compacts a surface on which the machine is supported;
first and second receivers configured to simultaneously receive a line of sight-based signal from the same remote controller, whereby one of the receivers will continue to receive the signal if a signal path to the other receiver is blocked by an obstruction, wherein
the first receiver is supported on the chassis in the vicinity of a first longitudinal end of the machine, and
the second receiver supported on the chassis in the vicinity of a longitudinal center of the machine.

2. The compaction machine of claim 1, further comprising a third receiver supported on the chassis in the vicinity of a second longitudinal end of the machine opposite the first longitudinal end, and wherein the second receiver is located in a first common reception zone with the first receiver and in a second common reception zone with the third receiver.

3. The compaction machine of claim 1, wherein the first and second receivers are photo-eyes configured to receive IR control signals transmitted by a remote controller.

4. The compaction machine of claim 1, further comprising shielding, located between the second receiver and a side edge of an upper surface of the compaction machine, that is configured to prevent a signal from impinging on the second receiver that is transmitted from a remote controller, reflected off from an operator, and reflected back to the compaction machine.

5. The compaction machine of claim 4, further comprising a subframe that is mounted on the chassis and that is covered by a hood, and wherein the second receiver is mounted in a recess in the hood, and wherein the shielding comprises at least one of 1) an edge of the recess and 2) a shield that is located laterally between the second receiver and an edge of the recess.

6. The compaction machine as recited in claim 1, wherein the compaction machine comprises first and second longitudinally-spaced rollers on which the mobile chassis is mounted and which compact the surface on which the machine is supported.

7. The compaction machine as recited in claim 6, wherein the compaction machine is a vibratory trench roller.

8. A compaction machine comprising
a mobile chassis;
first and second longitudinally-spaced rollers on which the mobile chassis is mounted and which compact a surface on which the machine is supported;
a first receiver supported on the chassis in the vicinity of a first longitudinal end of the machine;
a second receiver supported on the chassis in the vicinity of a second longitudinal end of the machine; and
a third receiver supported on the chassis in the vicinity of a center of the machine, wherein the first and third receivers or the second and third receivers are configured to simultaneously receive a line of sight based signal from the same remote controller, whereby one of the receivers will continue to receive the signal if a signal path to one of the other receivers is blocked by an obstruction.

9. The compaction machine of claim 8, wherein the machine is a vibratory trench roller.

10. The compaction machine of claim 8, wherein the first, second, and third receivers are photo-eyes configured to receive IR control signals transmitted from a remote controller.

11. The compaction machine of claim 8, further comprising shielding, located between the third receiver and a side edge of an upper surface of the compaction machine, that is configured to prevent a signal from impinging on the second receiver that is transmitted from a remote controller, reflected off from an operator, and reflected back to the compaction machine.

12. The compaction machine of claim 11, further comprising a subframe that is mounted on the chassis and that is covered by a hood, and wherein the third receiver is mounted in a recess in the hood, and wherein the shielding comprises at least one of 1) an edge of the recess and 2) a shield that is located laterally between the third receiver and an edge of the recess and that extends above a base of the recess.

13. A method comprising:
simultaneously transmitting a control signal from a remote controller to first and second spaced receivers in a common reception zone on a compaction machine such that, if the transmission of the control signal to one of the receivers is blocked by an obstruction, the control signal is still received by the other receiver, wherein the first and second receivers are located in the vicinity of a front end of the machine and a central portion of the machine, respectively, wherein the compaction machine further comprises a third receiver located in the vicinity of a second end of the machine, and wherein the transmitting step causes the signal to impinge either the first and second receivers or the second and third receivers in the absence of the presence of an obstruction.

14. The method of claim 13, wherein the control signal is an RF signal.

15. The method of claim 13, wherein the control signal includes a relatively high-intensity control signal that controls operation of the compaction machine and a relatively low-intensity safety signal that shuts down the machine.

16. The method of claim 15, further comprising blocking receipt of control signals to the second receiver that are located in a protection zone located beneath a geometric umbrella of reception capability extending around the second receiver.

17. The method of claim 13, wherein the compaction machine includes a mobile chassis and a compaction device on which the mobile chassis is mounted and which compacts a surface on which the machine is supported.

18. The method of claim 13, further comprising controlling propulsion of the compaction machine based on the control signal received from the remote controller.

19. A compaction machine:
a mobile chassis having first and second longitudinal ends;
a compaction device on which the mobile chassis is mounted and which compacts a surface on which the machine is supported;
first, second, and third receivers that are supported on the mobile chassis and that are spaced longitudinally from one another with the second receiver being located longitudinally between the first and third receivers, each of the first, second, and third receivers being configured to receive a line of sight-based control signal from the same remote controller and having a dedicated reception zone associated therewith from which the receiver is capable of receiving the control signal, wherein the second receiver is located within the reception zones of both the first and third receivers.

20. The compaction machine of claim 19, wherein the first and second receivers are located in the vicinity of a front end of the compaction machine and a central portion of the compaction machine, respectively, and wherein the third receiver is located in the vicinity of a second end of the compaction machine.

21. The compaction machine of claim 19, wherein the first and third receivers are located outside of the receptions zones of one another.

* * * * *